(12) United States Patent
Abedini et al.

(10) Patent No.: US 11,696,218 B2
(45) Date of Patent: Jul. 4, 2023

(54) MULTIPLEXING INITIAL ACCESS AND DATA TRANSMISSIONS IN ASSISTED MILLIMETER WAVE SYSTEMS

(71) Applicant: QUALCOMM Incorporated, San Diego, CA (US)

(72) Inventors: Navid Abedini, Raritan, NJ (US); Bilal Sadiq, Basking Ridge, NJ (US); Sundar Subramanian, Bridgewater, NJ (US); Muhammad Nazmul Islam, Edison, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 15/789,459

(22) Filed: Oct. 20, 2017

(65) Prior Publication Data

US 2018/0115940 A1    Apr. 26, 2018

Related U.S. Application Data

(60) Provisional application No. 62/411,416, filed on Oct. 21, 2016, provisional application No. 62/411,400, filed on Oct. 21, 2016.

(51) Int. Cl.
*H04W 48/12* (2009.01)
*H04B 7/06* (2006.01)
(Continued)

(52) U.S. Cl.
CPC .......... *H04W 48/12* (2013.01); *H04B 7/0617* (2013.01); *H04L 5/0051* (2013.01);
(Continued)

(58) Field of Classification Search
CPC ... H04W 48/12; H04W 76/02; H04W 56/003; H04W 72/0406; H04L 27/2655; H04B 7/0617
See application file for complete search history.

(56) References Cited

U.S. PATENT DOCUMENTS 9,094,988 B2    7/2015  Damnjanovic et al.
2003/0162551 A1*  8/2003  Atarashi ............... H04B 7/0408
                                                    370/491
(Continued)

FOREIGN PATENT DOCUMENTS

CN    101163318 A    4/2008
CN    101835224 A    9/2010
(Continued)

OTHER PUBLICATIONS

International Search Report and Written Opinion—PCT/US2017/057755—ISA/EPO—dated Jan. 19, 2018.
(Continued)

*Primary Examiner* — Ajit Patel
*Assistant Examiner* — Wilfred Thomas
(74) *Attorney, Agent, or Firm* — Patterson & Sheridan, L.L.P/Qualcomm Incorporated

(57) ABSTRACT

Certain aspects of the present disclosure provide techniques for multiplexing initial access transmissions with data and/or control transmissions. For example, the techniques include a method for wireless communication by a first base station (BS). The method includes communicating, in a first time interval, with at least a first user equipment (UE), via directional transmissions using a first set of frequency resources, and participating in at least one of an access or management procedure, during the first time interval, via directional transmissions using a second set of frequency resources.

30 Claims, 10 Drawing Sheets

(51) Int. Cl.

| | | |
|---|---|---|
| *H04L 5/00* | (2006.01) | |
| *H04L 27/26* | (2006.01) | |
| *H04W 56/00* | (2009.01) | |
| *H04W 74/00* | (2009.01) | |
| *H04W 76/10* | (2018.01) | |
| *H04W 76/15* | (2018.01) | |
| *H04W 16/28* | (2009.01) | |
| *H04W 16/32* | (2009.01) | |
| *H04W 52/04* | (2009.01) | |
| *H04W 72/04* | (2009.01) | |
| *H04W 72/20* | (2023.01) | |

(52) U.S. Cl.
CPC .......... *H04L 5/0053* (2013.01); *H04L 5/0094* (2013.01); *H04L 27/2655* (2013.01); *H04L 27/2666* (2013.01); *H04W 56/004* (2013.01); *H04W 74/006* (2013.01); *H04W 76/10* (2018.02); *H04W 76/15* (2018.02); *H04W 16/28* (2013.01); *H04W 16/32* (2013.01); *H04W 52/04* (2013.01); *H04W 56/003* (2013.01); *H04W 72/20* (2023.01); *H04W 74/002* (2013.01)

(56) References Cited

U.S. PATENT DOCUMENTS

| | | |
|---|---|---|
| 2003/0214914 A1 | 11/2003 | Cain |
| 2010/0029216 A1 | 2/2010 | Jovicic et al. |
| 2011/0237261 A1* | 9/2011 | Meshkati ............ H04W 48/12 455/438 |
| 2011/0243095 A1 | 10/2011 | Chin et al. |
| 2012/0163305 A1 | 6/2012 | Nimbalker et al. |
| 2012/0243638 A1 | 9/2012 | Maltsev et al. |
| 2013/0182683 A1* | 7/2013 | Seol ................ H04W 72/046 370/335 |
| 2014/0204846 A1* | 7/2014 | Maltsev .............. H04B 7/0617 370/329 |
| 2015/0223088 A1 | 8/2015 | Niu et al. |
| 2016/0050050 A1* | 2/2016 | Kang .................. H04B 7/0617 370/329 |
| 2016/0057604 A1* | 2/2016 | Luo ...................... H04W 8/005 370/330 |
| 2016/0095077 A1 | 3/2016 | Kwak et al. |
| 2016/0301517 A1 | 10/2016 | Da |
| 2016/0338039 A1 | 11/2016 | Van et al. |
| 2017/0055298 A1 | 2/2017 | Pawar et al. |
| 2017/0071023 A1 | 3/2017 | Kunz et al. |
| 2017/0201917 A1 | 7/2017 | Han et al. |
| 2017/0207843 A1* | 7/2017 | Jung .................... H04B 7/0632 |
| 2017/0288743 A1* | 10/2017 | Nam ...................... H04B 7/024 |
| 2017/0339678 A1 | 11/2017 | Wei et al. |
| 2017/0367069 A1 | 12/2017 | Agiwal et al. |
| 2017/0374703 A1 | 12/2017 | Sang et al. |
| 2018/0035396 A1* | 2/2018 | Stirling-Gallacher ....................... H04W 56/0005 |
| 2018/0091212 A1 | 3/2018 | Lee et al. |
| 2018/0115990 A1 | 4/2018 | Abedini et al. |
| 2019/0141617 A1 | 5/2019 | Abedini et al. |

FOREIGN PATENT DOCUMENTS

| | | |
|---|---|---|
| CN | 101895310 A | 11/2010 |
| CN | 103167624 A | 6/2013 |
| CN | 103889011 A | 6/2014 |
| CN | 104205674 A | 12/2014 |
| EP | 2793526 A1 | 10/2014 |
| WO | 2009151291 A2 | 12/2009 |
| WO | 2013109531 | 7/2013 |
| WO | 2013149189 A1 | 10/2013 |

OTHER PUBLICATIONS

Astri, TCL: "Inter-Virtual Cell Handover in Two-Layer NR Networks", R2-166803, 3GPP TSG-RAN WG2 #95bis, Kaohsiung, Taiwan, Oct. 10-14, 2016, 4 Pages.

ASUSTeK: "Consideration on Beamforming for Cell Level Mobility", R2-166586, 3GPP TSG-RAN WG2 Meeting #95bis, Kaohsiung, Taiwan, Oct. 10-14, 2016, 3 Pages.

Ericsson: "RRM Measurements and Mobility Control in RRC Connected", R2-166923, 3GPP TSG-RAN WG2 #95bis, Kaohsiung, Taiwan, Oct. 10-14, 2016, 3 Pages.

Nokia et al., "On UE Capability and Network Node Coordination Aspects in LTE-NR Tight Interworking", R2-166243, 3GPP TSG-RAN WG2 Meeting #95bis, Kaohsiung, Taiwan, Oct. 10-14, 2016, 9 Pages.

Qualcomm Incorporated: "RRC Procedures for Network Based and UE Based Mobility", R2-167058, 3GPP TSG-RAN WG2 Meeting #95bis, Kaohsiung, Taiwan, Oct. 10-14, 2016, 4 Pages.

* cited by examiner

MULTIPLEXING INITIAL ACCESS AND DATA TRANSMISSIONS IN ASSISTED MILLIMETER WAVE SYSTEMS

CLAIM OF PRIORITY UNDER 35 U.S.C. § 119

The present Application for Patent claims benefit of U.S. Provisional Patent Application Ser. No. 62/411,400, filed Oct. 21, 2016 and U.S. Provisional Patent Application Ser. No. 62/411,416, filed Oct. 21, 2016, assigned to the assignee hereof and hereby expressly incorporated by reference herein.

BACKGROUND

Field of the Disclosure

Aspects of the present disclosure relate to wireless communications, and more particularly, to a base station (BS) assisting a user equipment (UE) in establishing initial access and data transmissions with another BS.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. These improvements may be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure relate to methods and apparatus for assisting a UE in performing initial access to a BS. As described herein, a first BS may communicate, in a first time interval, with at least a first user equipment (UE), via directional transmissions using a first set of frequency resources and participate in at least one of an access or management process during the first time interval (e.g., with at least a second UE), via directional transmissions using a second set of frequency resources. In certain aspects, the first UE and the second UE may be the same UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
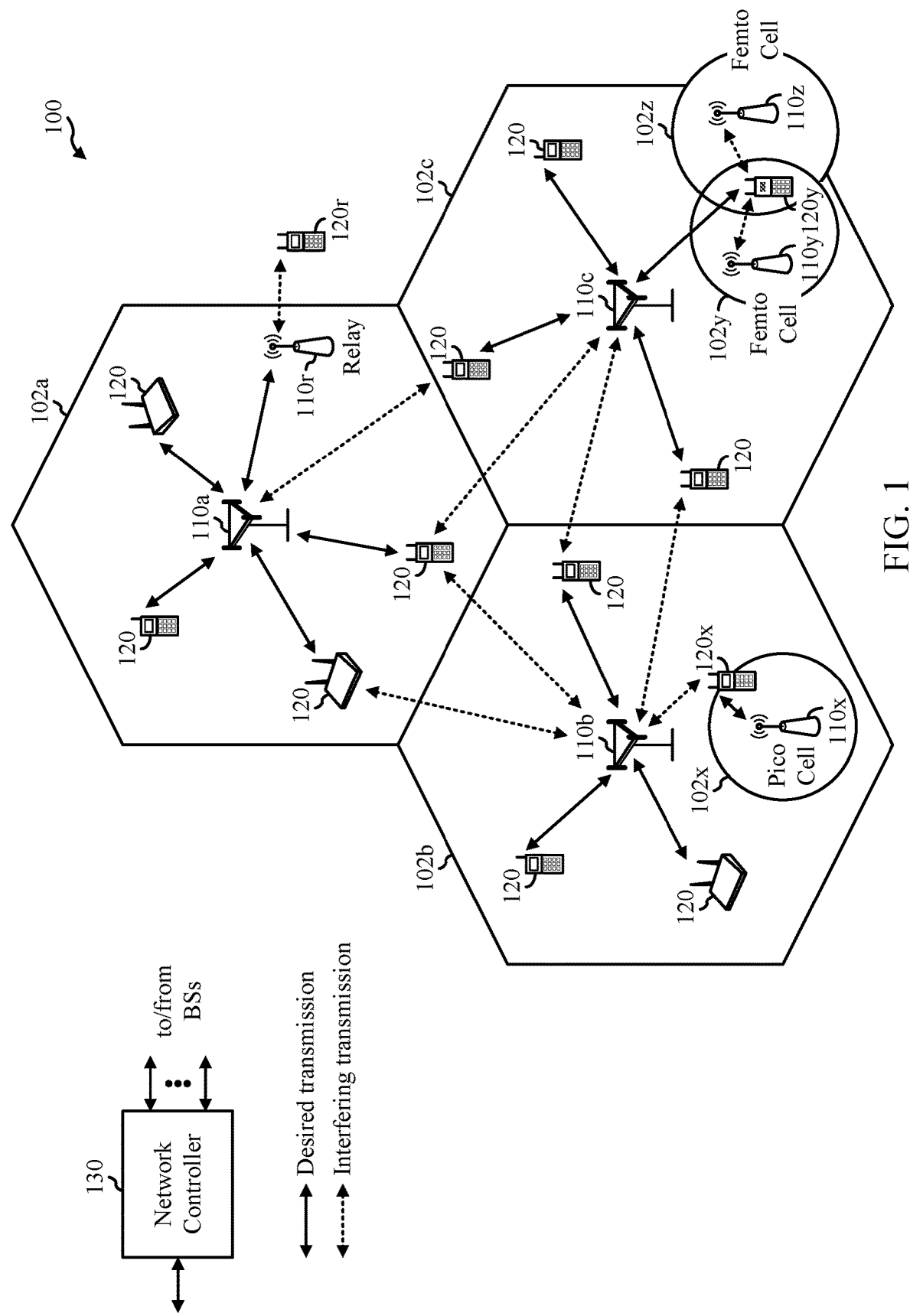
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network. NR wireless communication systems may employ beams, where a BS and UE communicate via active beams.

For illustrative purposes, aspects are described with reference to a primary BS and a secondary BS, wherein the secondary BS operates in a millimeter-wave (mmWave) frequency spectrum and the primary BS operations in a lower frequency spectrum that the secondary spectrum; however, aspects may not be limited to this example scenario.

Figure 8:
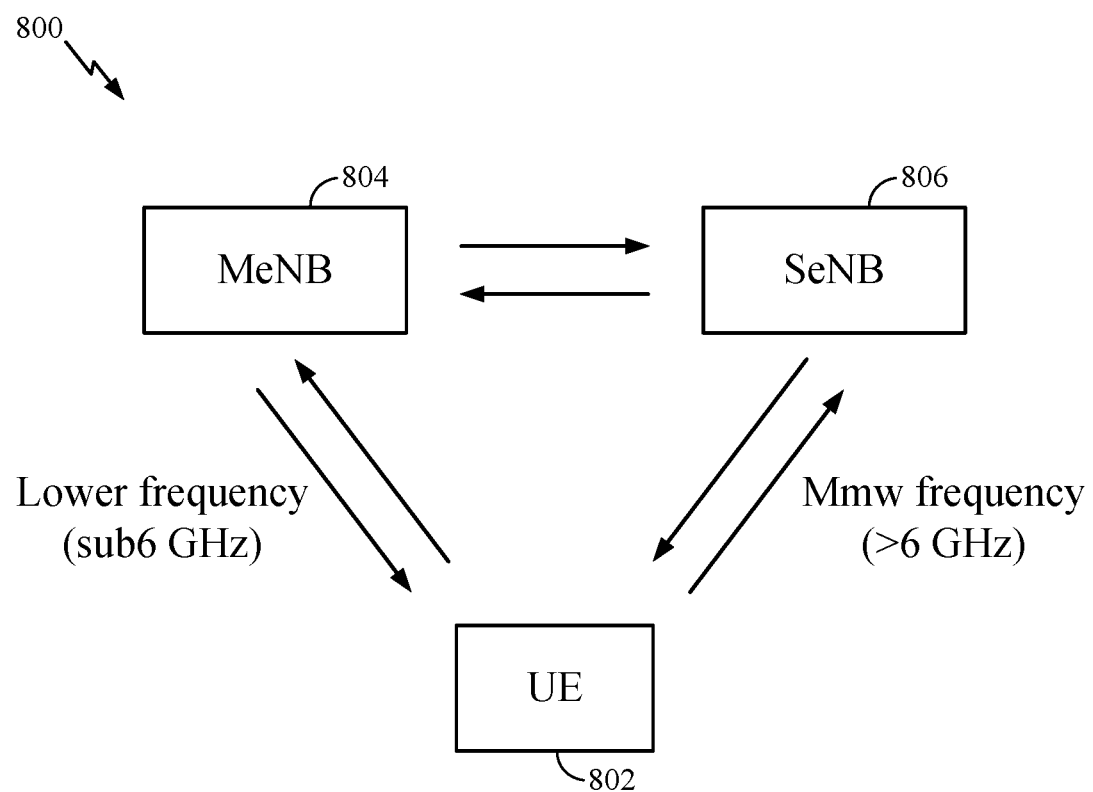
FIG. 8 illustrates an example wireless communication system, in which aspects of the present disclosure may be implemented.

As described herein, for example, with respect to FIG. 8, procedures related a UE communicating with a BS via multiple beams, such as initial access and data transmissions, including (but not limited to) beam management mobility management, radio resource management (RRM), or radio link monitoring (RLM) may be simplified with assistance from a BS operating in a lower frequency spectrum. With the assistance of the BS operating in a lower frequency spectrum, mmWave resources may be conserved and, in certain scenarios, initial synchronization to the mmWave network may be completely or partly bypassed.

UEs 120 may be configured to perform the operations 900 and methods described herein for determining a transmit power. BS 110 may comprise a transmission reception point (TRP), Node B (NB), 5G NB, access point (AP), new radio (NR) BS, Master BS, primary BS, etc.). The NR network 100 may include the central unit. The BS 110 may perform the operations 1000 and other methods described herein for providing assistance to a UE in determining a transmit power to use during a RACH procedure with another BS (e.g., a secondary BS).

A UE 120 may determine a transmit power for transmitting a message during a RACH procedure with a secondary BS, based at least in part, on communication between the UE and a primary BS. The UE may transmit the message to the secondary BS during the RACH procedure based, at least in part, on the determined transmit power.

A BS 110, such as a master BS or a primary BS, may communicate with the UE and may take one or more actions to assist the UE in setting a transmit power for transmitting a message during the RACH procedure with a secondary BS.

As illustrated in FIG. 1, the wireless network 100 may include a number of BSs 110 and other network entities. According to one example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
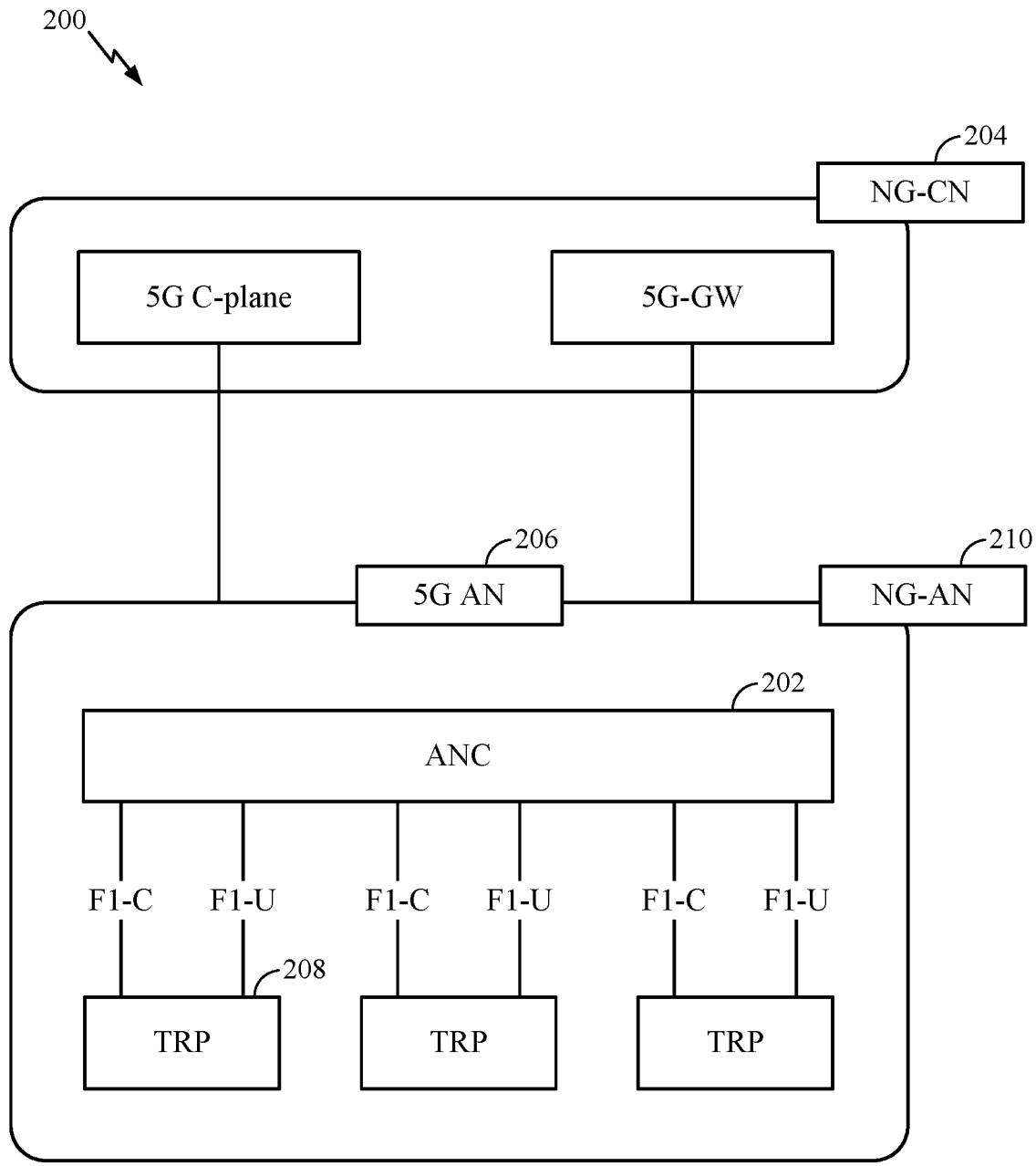
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
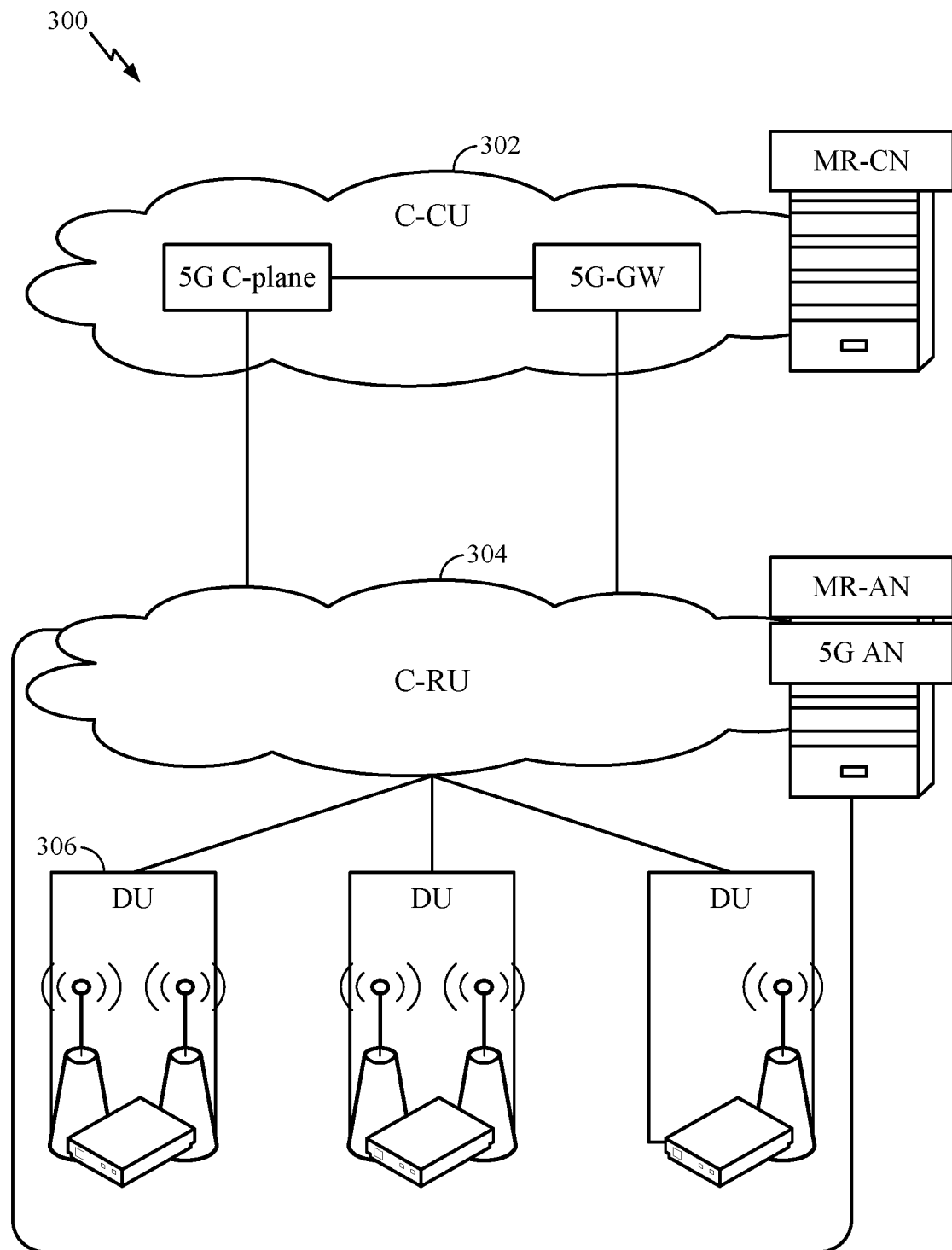
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
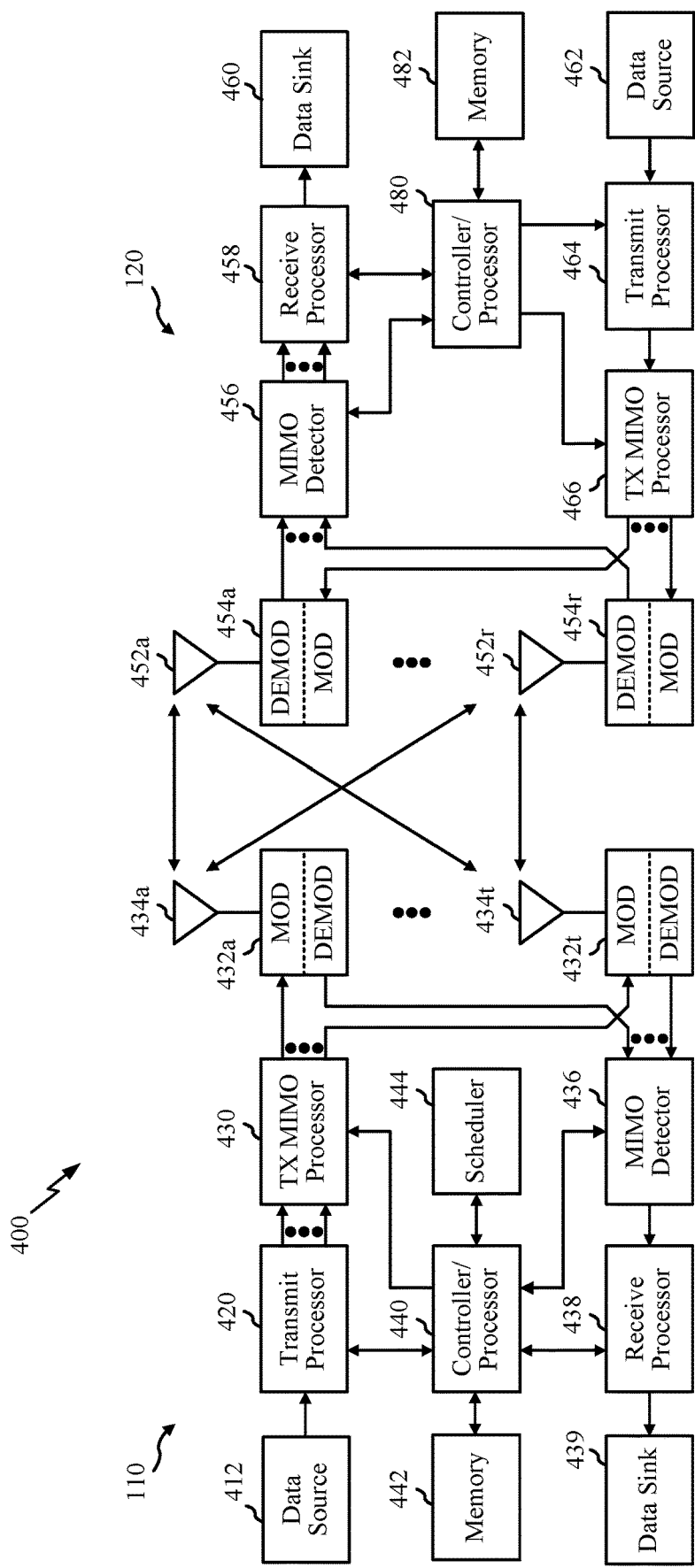
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). According to aspects, the Master BS may operate at lower frequencies, for example, below 6 GHz and a Secondary BS may operate at higher frequencies, for example, mmWave frequencies above 6 GHz. The Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
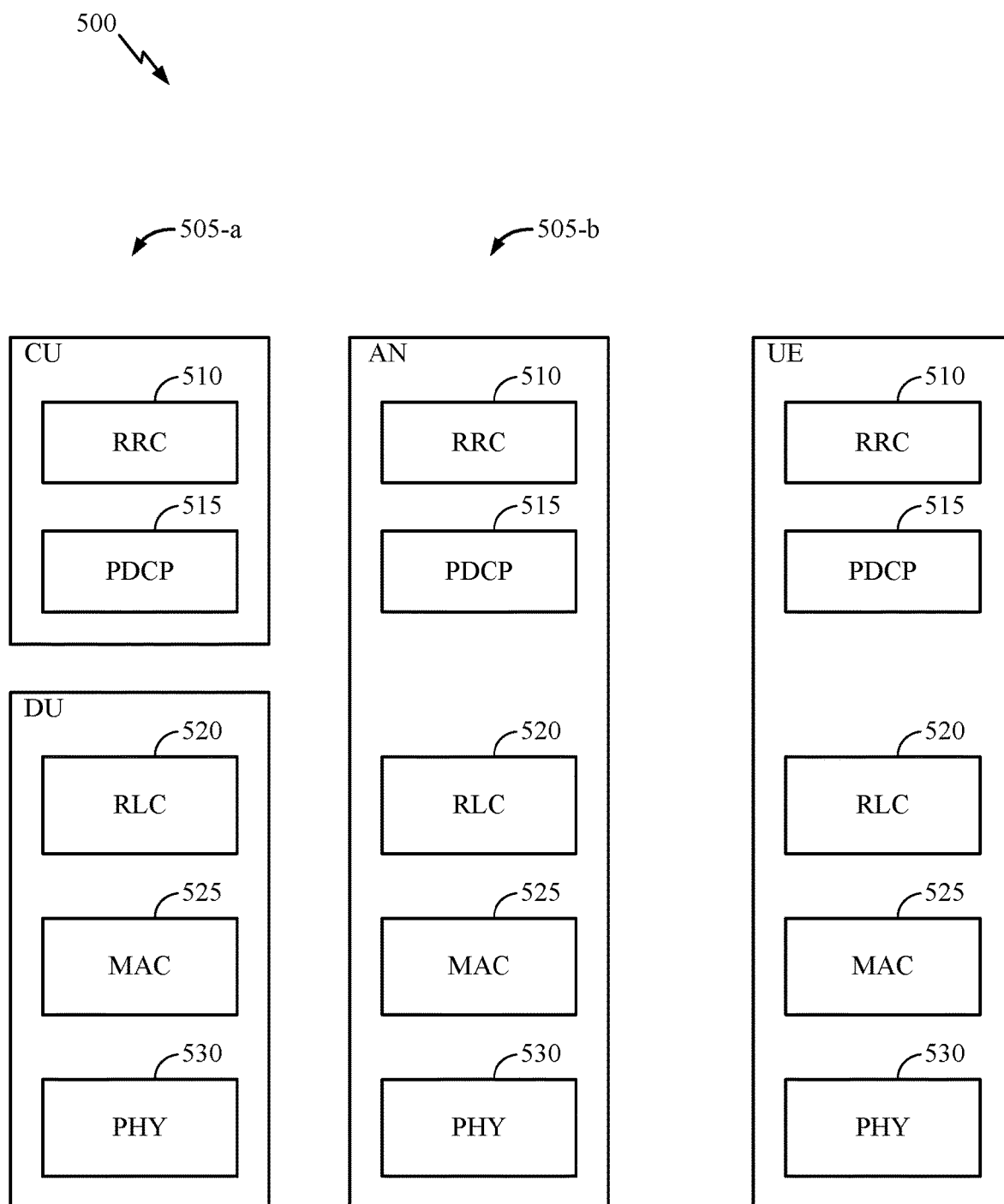
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
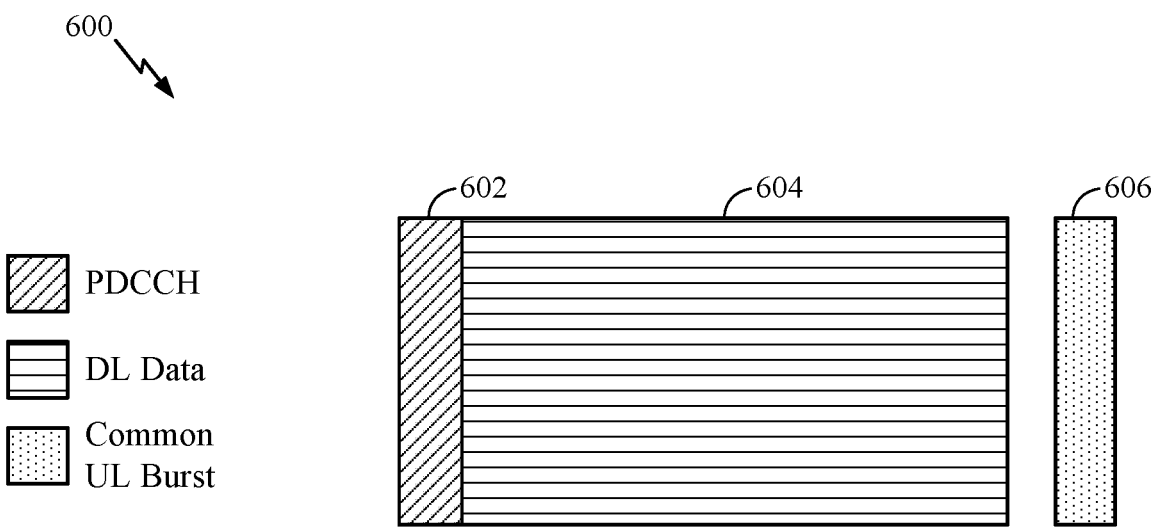
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
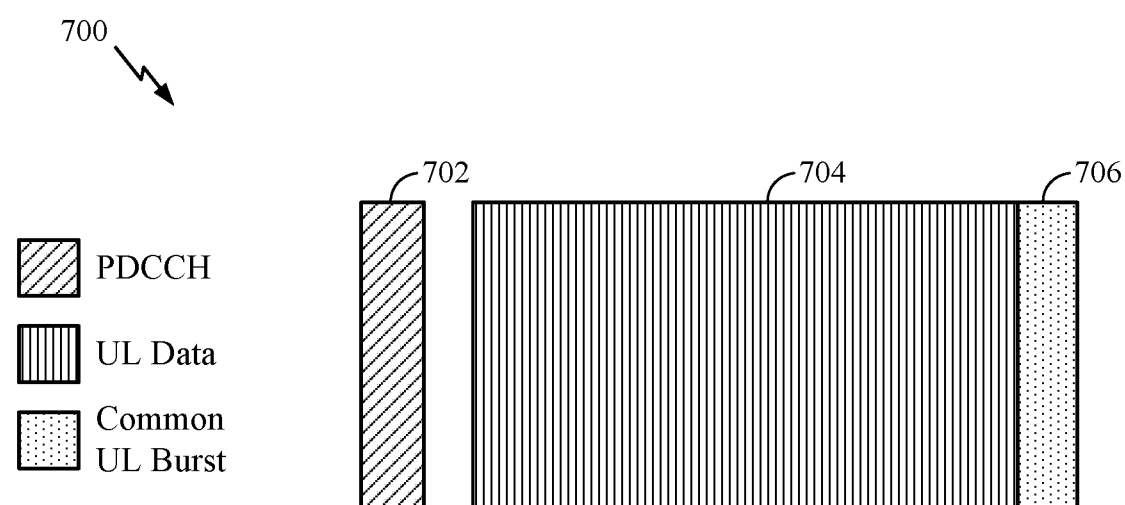
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Assisted mmWave Access

FIG. 8 illustrates an example 800 of an assisted mmWave access process (or a beam management, mobility management, radio resource management (RRM), or radio link monitoring (RLM) procedure). A UE 802 may want to access a BS 806. The BS 806 may be a secondary BS that for example operates in an mmWave spectrum. Another BS, such as BS 804, may assist the UE in accessing the BS 806. According to an example, BS 804 may be a primary BS that operates in a lower frequency spectrum as compared to the BS 806. The BSs 804 and 806 may communicate with each other. According to aspects, the BSs 804 and 806 may be co-located. The BS 806 and UE 802 may communicate with each other using beams.

In accordance with one or more aspects, the BSs 804 and 806 may use the same or different radio access technology (RAT), the same or different frequency band, and in some cases the BSs 804 and 806 may be the same BS. For example, in some cases, the BSs 804 and 806 may be in two neighboring cells using a same frequency and RAT such as a serving cell and neighbor cell that is helping. In another case the BSs 804 and 806 may use different carrier frequencies and/or RATs, for example one BS could use LTE and the other could use mmWave or NR, or one BS could use sub-6 GHz NR and the other could use mmWave NR. Further, in another example, the BSs 804 and 806 may be co-located in one BS configured to operate both sets of operations provided by the BSs 804 and 806 to communicate with a UE.

As described above, mmWave communication may be beam-formed, wherein wireless devices may communicate using directional beams. A UE 802 receiving assistance, from BS 804, in accessing the BS 806 may simplify access to the mmWave network. Additionally, assistance from the BS 804 may help conserve mmWave resources. The conserved resources may increase flexibility in the mmWave network. For example, the BS 806 may flexibly (e.g., dynamically) allocate directional synchronization and directional RACH resources per demands of UEs.

Typically, UE's initial access to a network may involve performing synchronization to acquire time, frequency, and system information of the serving BS. After synchronization, the UE may transmit a RACH preamble to identify itself to BS. The UE and BS may complete the initial access process by exchanging additional messages, including a Random Access Response (message 2), message 3, and 4 during a RACH procedure. According to aspects of the present disclosure, a UE 802 may advantageously not perform synchronization to the BS 806 prior to transmitting the RACH preamble.

Synchronization and random access (RACH) in an mmWave system may include the transmission and reception of beam-formed signals. Thus, synchronization and random access may be referred to as directional SYNC and directional RACH. Synchronization and random access in lower frequency wireless communication system may be referred to as SYNC and RACH.

Two modes of directional SYNC and directional RACH may exist: assisted directional SYNC/RACH and common, directional SYNC/RACH. Assisted directional SYNC/RACH may involve assistance from a BS 804 (e.g. operating in a lower frequency than BS 806) in performing synchronization to/random access with the BS 806. The configuration and/or resources of assisted directional SYNC/RACH may be UE-specific. In one or more cases, the configuration may include a beam reference signal configuration. Further, an example of a beam reference signal includes, but is not limited to, a channel state information reference signal (CSI-RS), which may be UE-specific. Common directional SYNC/RACH may not include assistance from the BS 804. The configuration for common, directional SYNC/RACH may be system/cell-specific and not UE-specific.

As used herein, the term mmWave generally refers to spectrum bands in very high frequencies such as 28 GHz. Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave may be leveraged to form narrow directional beams that may send and receive more energy, which may help overcome the propagation/path loss challenges.

These narrow directional beams may also be utilized for spatial reuse. This is one of the key enablers for utilizing mmWave for mobile broadband services. In addition, the non-line-of-site (NLOS) paths (e.g., reflections from nearby building) may have very large energies, providing alternative paths when line-of-site (LOS) paths are blocked. Aspects of the present disclosure may take advantage of such directional beams, for example, when a UE performs initial access, beam management, mobility management, RRM, and/or RLM with a mmWave base station (e.g., and SeNB).

In some cases, the assisted access process may be provided between a variety of different wireless nodes/device combinations that are not limited to that which is shown in FIG. 8. For example, the wireless nodes may include a set of at least two wireless nodes that include any combination of one or more of a gNBs, a relay(s), and a UE(s). Accordingly, the assisted access process may be provided over a number of different communication implementations that depend from the specific wireless devices selected. In some cases, the communication involves one or more of backhaul (BH), integrated access and backhaul (IAB), and/or D2D communication between two UEs. IAB may include the sharing of the same technology and the same resources shared between access links and/or backhaul links. In some cases, a UE may operate and provide communication abilities of a BS.

Example Multiplexing of Initial Access and Data Transmissions

In assisted mmWave access, different modes of operation may exist based on the level of involvement of a primary BS. In one example, the primary BS may provide a UE with a minimum amount of information for transmitting a directional RACH preamble to a secondary BS.

With reference to FIG. 8, the BS 804 may provide the UE 802 with a minimum amount of information, such as the time/frequency resources for directional RACH transmission and directional RACH preamble configuration (e.g., choices of Zadoff-Chu root/cyclic shift or the subcarrier spacing), association between RACH resources and SYNC or beam reference resources or configuration, configuration of message2 of RACH (e.g., choice of subcarrier spacing for message2) for use in communicating with the BS 806. In one example, at least part of these resources and configurations are UE-specifically determined. For example, some time/frequency resources for RACH transmission may be dedicated to the UE. According to certain aspects of the present disclosure, the UE 802 may, advantageously, not perform directional SYNC to the BS 806. The UE may bypass synchronization because of the assistance received from the BS 804.

In a common (as opposed to assisted) directional access process, some time/frequency resources in the system are typically set aside for the RACH (and possibly SYNC) transmission. These resources are typically allocated periodically, and the configuration (e.g. position/periodicity) is not UE specific.

In the assisted directional access process, on the other hand, the initial access (RACH and/or SYNC) resources allocated to the UE(s) may be different from the common directional initial access resources. The assisted directional initial access resources may be UE-specific, meaning each is set or resources is allocated to the specific UE(s), for example, based on their demands (e.g., traffic and/or service needs), or capabilities (e.g. RF and digital processing capabilities, spatial multiplexing capabilities, full-duplex capability, beam correspondence) or categories (e.g. UEs with different categories or relays). In some cases, the assisted directional initial access resources may be achieved by repurposing some resources also available for use in common cell-based communications (e.g., PUSCH/PDSCH resources). In one or more cases, the resources allocated to the UE(s) may be for beam management, mobility management, RRM and/or RLM.

Aspects of the present disclosure, allow the allocated assisted directional initial access resources (e.g., RACH and/or SYNC) to be frequency multiplexed (FDM'd) with other transmissions (UL and/or DL transmissions). In this manner, a BS may communicate (e.g., exchange UL and/or DL data) with a first UE (or UEs) using a first set of frequency resources, while (simultaneously) participating in initial access with a second UE (or UEs). In some examples, the first and the second UEs are the same UE.

Figure 9A:
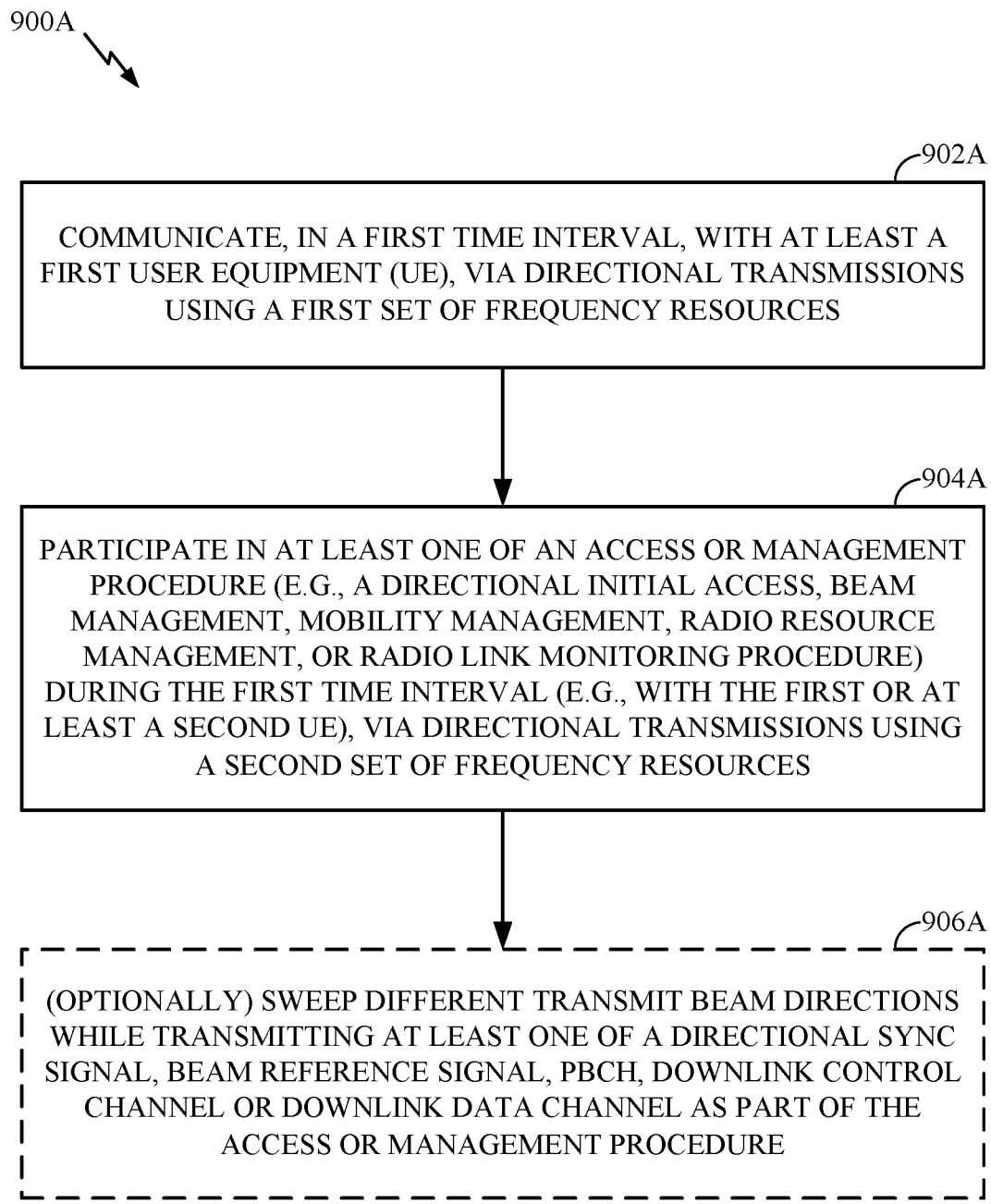
FIGS. 9A and 9B illustrate example operations performed by a base station, in accordance with certain aspects of the present disclosure.

FIG. 9A illustrates example operations 900A, which may be performed by BS, according to aspects of the present disclosure. The BS may include one or more modules of the BS 110 illustrated in FIG. 4. The BS 110 may be a secondary BS that communicates with one or more UEs in a mmWave frequency spectrum.

At 902A, the primary BS communicates, in a first time interval, with at least a first user equipment (UE), via directional transmissions using a first set of frequency resources.

At 904A, the primary BS participates in at least one of an access or management process (e.g., an initial access, beam management, mobility management, RRM or RLM procedure) during the first time interval (e.g., with the first UE or at least a second UE), via directional transmissions using a second set of frequency resources. In some cases, the first set of frequency resources and the second set of frequency resources are non-overlapping.

The primary BS communicatios with the UE using the first set of frequency resources and/or the access or management procedure the primary BS participates in with the first UE using the second set of frequency resources may involve downlink transmissions, uplink transmissions, or both.

On the downlink side, the communications with the first UE may involve transmitting at least one of a directional physical downlink shared channel (PDSCH), a physical downlink control channel (PDCCH), a paging channel, a beam reference signal, or a synchronization signal to the first UE using the first set of frequency resources, while participating in the access or management procedure may involve transmitting a directional SYNC signal, beam reference signal, PBCH, downlink control channel or downlink data channel. As illustrated, at 906A, the primary BS may sweep different transmit beam directions while transmitting at least one of the directional SYNC signal, beam reference signal, PBCH, downlink control channel or downlink data channel as part of the access or management procedure.

Figure 9B:
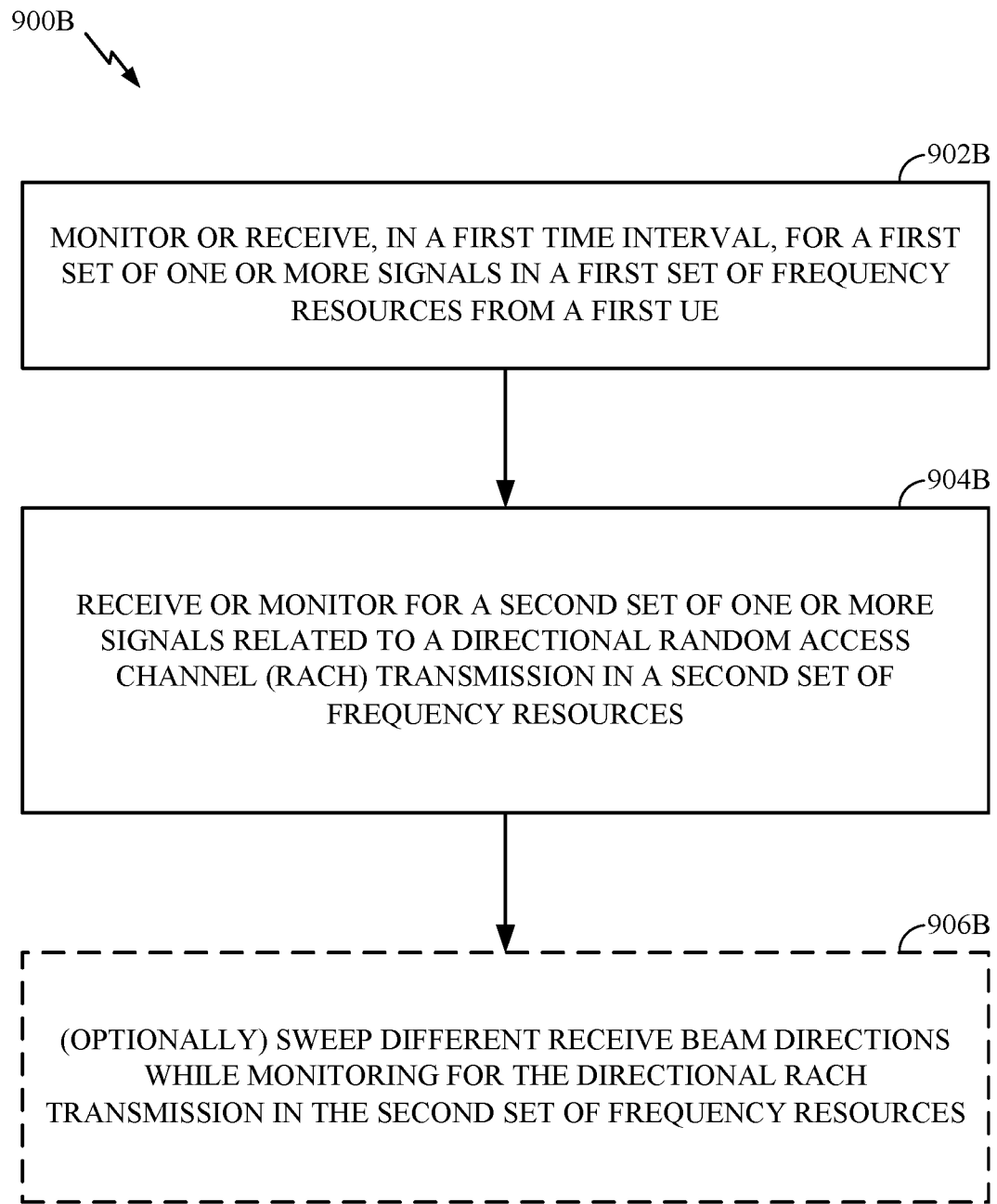

As illustrated in FIG. 9B, on the uplink side, the primary BS communication with the first UE may involve receiving or monitoring for a first set of one or more signals in the first set of frequency resources from the first UE (902B). Participating in the access or management procedure may involve receiving or monitoring for a second set of one or more signals related to a directional random access channel (RACH) in the second set of frequency resources (904B). As illustrated, at 906B, the primary BS may optionally sweep different receive beam directions while monitoring the directional RACH transmission in the second set of frequency resources.

In some cases, some resources may be allocated to one or more UEs to perform directional RACH preamble transmission, where these resources are frequency division multiplexed (FDM'd) with other resources within which one or more other UEs transmit directional data/control channels to the same mmWave eNB.

Figure 10:
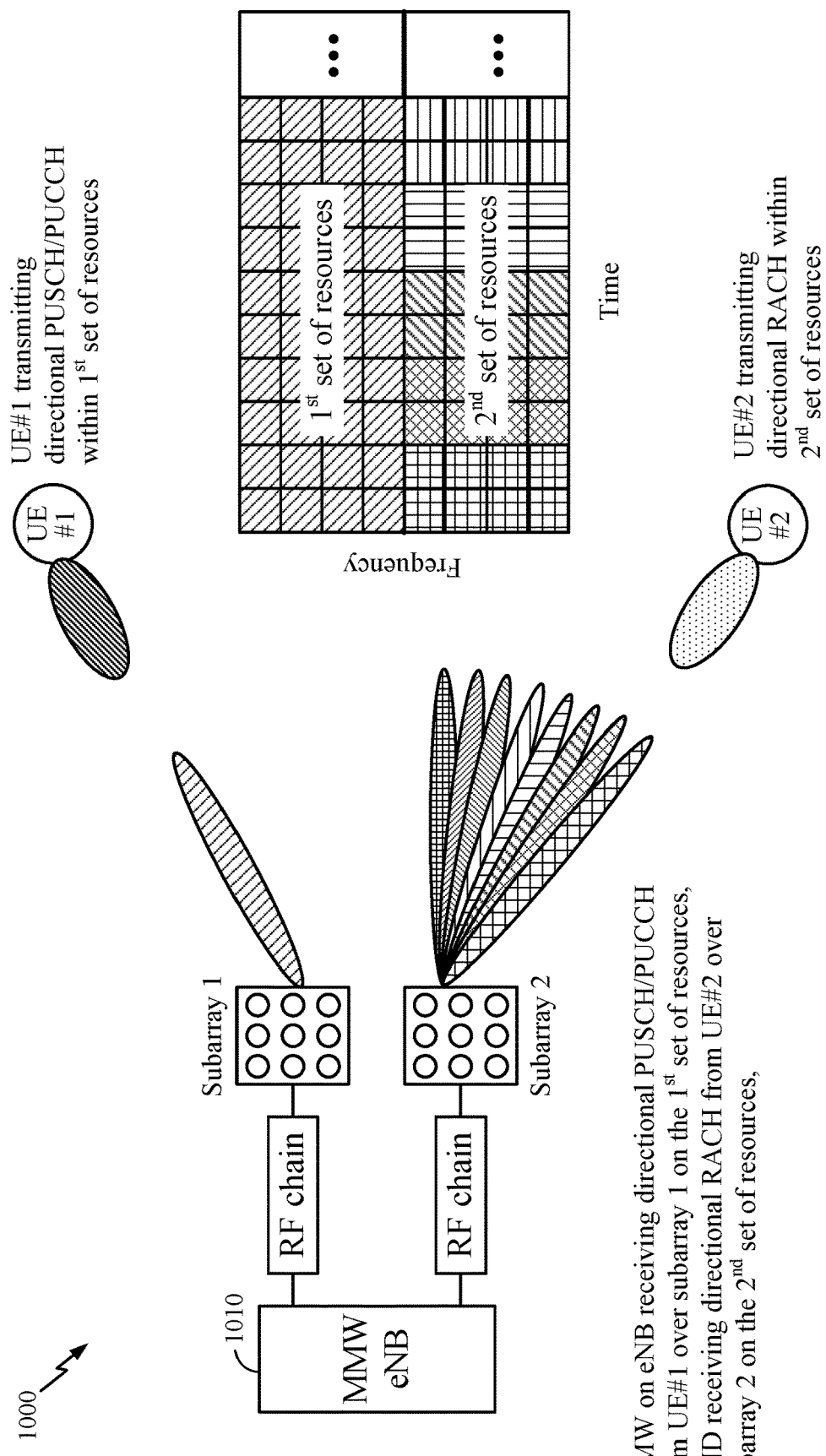
FIG. 10 illustrates an example assisted millimeter wave system with multiplexing of initial access and data transmissions, in accordance with certain aspects of the present disclosure.

For example, as illustrated in FIG. 10, in an example assisted mmWave system 1000, a first set of frequency resources are used for a base station 1010 (e.g., an mmWave SeNB) to receive directional PUSCH/PUCCH from one or more UEs (e.g., UE #1). As illustrated, the base station 1010 may receive the PUSCH/PUCCH transmissions using a 1st subset of its antenna subarrays (ports), while receiving directional RACH transmissions from one or more other UEs (e.g., UE #2) on a second set of frequency domain resources, The base station may use a 2nd subset of its antenna subarrays (ports) to receive RACH on the second set of frequency domain resources.

As illustrated, in some cases, the mmWave eNB may sweep different beams/directions (with sweeping referring to the use of different beams/directions at different times) while receiving RACH on the 2nd subset of antenna subarrays (e.g., the subset may include at least one subarray). This sweeping may help the mmWave eNB select a particular beam direction (or Rx/Tx pair) and may use this for future communications (e.g., when sending a RACH response message) and may provide an indication of a particular transmit direction to UE #2.

In some cases, the assignment for transmitting the directional PUSCH/PUCCH on the 1st set of resources may be provided via a directional PDCCH transmitted by the mmWave eNB (SeNB). On the other hand, the assignment for transmitting the directional RACH on the 2nd set of resources may come from the MeNB (e.g., an assisting eNB operating at lower frequency).

In some cases, there may be two modes of RACH: a first mode of RACH (e.g. the common RACH), and a second mode of RACH (e.g., dedicated RACH). Some resources may be allocated to one or more UEs to perform the second mode RACH preamble transmission, where these resources are frequency division multiplexed (FDM'd) with other resources within which one or more other UEs participate in the first mode of RACH with the same mmWave eNB. The dedicated RACH (second mode) may be used for a different purpose than the other (common) RACH. In one example, the dedicated RACH may be used for recovery from a beam failure event. In some examples, the dedicated RACH may be configured specifically for a UE. In another example, the two modes of RACH may be used by two groups of wireless nodes (UEs, relays, BSs), based for example on their categories and capabilities. In one example, the first mode may be used by the UEs in the system and the second mode by the relays. In one example, the configuration of the dedicated RACH (second mode) may be different from the other (common) RACH in terms of at least one of a preamble sequence related parameter (e.g. root sequence, cyclic shift, preamble index), maximum number of transmissions, power control parameters (e.g. maximum number of power rampings, target received power, retransmission power ramping steps size), timer setting, association with other signals (e.g. synchronization and/or beam reference signals), and/or numerology.

Just as RACH signal transmissions may be FDM'd with data transmissions, SYNC signal transmissions may also be FDM'd within other resources within which the eNB transmits directional reference signal (e.g., a beam reference signal, a synchronization signal, a synchronization channel, a demodulation reference signal), or data/control channels to other UEs (e.g., same or different sets of UEs).

Referring again to FIG. 10, in such cases, the mmWave eNB 1010 may simultaneously transmit directional PDSCH/PDCCH to one or more UEs (UE #1) on a 1st set of frequency domain resources using a 1st subset of its antenna subarrays (ports), while transmitting directional SYNC to one or more other UEs (UE #2) on a 2nd set of frequency domain resources. The eNB may use a 2nd subset of its antenna subarrays (ports) or the 1st subset of its antenna subarrays (ports) when transmitting on the 2nd set of frequency domain resources.

In this scenario, the mmWave eNB may sweep different beams/directions while transmitting SYNC signals on the 2nd subset of antenna subarrays. This sweeping may help the mmWave eNB and/or UE #2 determine a particular beam direction (or Rx/Tx pair of beam directions) and may use this for future communications (e.g., based on feedback from UE #2).

The assignment for receiving the directional PDSCH on the 1st set of resources may come from some directional PDCCH transmitted by the mmWave eNB (SeNB). On the other hand, the assignment for receiving the directional SYNC on the 2nd set of resources may come from MeNB (an assisting eNB at lower frequency).

In some cases, the control/data transmissions FDM'd with synchronization transmission may be associated with at least one of a paging channel, a transmission of part of system information (e.g., transmission of remaining minimum system information (RMSI), or other system information (OSI)).

In some cases, there may be two modes of SYNC: a first mode of SYNC (e.g. the common SYNC used for initial access), and a second mode of SYNC (e.g., dedicated RACH). Some resources may be allocated to one or more UEs to perform the second mode SYNC, where these resources are frequency division multiplexed (FDM'd) with other resources within which one or more other UEs participate in the first mode of SYNC with the same mmWave eNB. The second mode of SYNC may be used for a different purpose than the other SYNC. In one example, the second mode of SYNC may be used for one or more of a beam management, RRM, RLM, or access. In some examples, multiple second mode of SYNC may be configured (e.g. with different resources and/or configuration) for two or more different procedures. For example, the first SYNC may be configured for RRM and the second SYNC may be configured for RLM. In some examples, the second mode of SYNC may be configured specifically for a UE. In another example, the two modes of SYNC may be used by two groups of wireless nodes (UEs, relays, BSs), based on their categories and capabilities. In one example, the first mode may be used by the UEs in the system and the second mode by the relays. The configuration of the second mode of SYNC may be different from the other SYNC in terms of at least one of a sequence related parameter (e.g. root sequence, cyclic shift of a synchronization signal (a primary synchronization signal (PSS), a secondary synchronization signal (SSS), a tertiary synchronization signal (TSS), a timing or frequency refinement signal (TRS)), a beam reference signal, a demodulation reference signal), a synchronization channel related parameters (e.g. content and configuration of a physical broadcast channel or a downlink control and data channel that carry part of the system information), numerology, beam sweep periodicity (e.g. sync burst set periodicity), number of signals transmitted within a window (e.g. within a period), the information carried by the signals, association with other signals (e.g. synchronization and/or beam reference signals), and the QCL assumption.

In some cases, the FDM'd transmissions on the 1st set of frequency resources and 2nd set of frequency resources may be quasi-collocated (QCL). The QCL assumption may be with respect to different parameters, for example, spatially QCL, or QCL with respect to at least one of average delay, delay spread, Doppler shift, or Doppler spread. In some examples, the FDM'd transmissions on the 1st set of frequency resources and 2nd set of frequency resources may use the same or different configuration (e.g., a numerology). Signals transmitted on QCL resources may also be referred to as QCL.

In the above examples, the FDM'd transmissions on the 1st set of resources and the 2nd set of resources may include transmission of any combination of a synchronization signal (PSS, SSS, TSS, TRS) and a beam reference signal (e.g., CSI-RS). For example, a first synchronization signal (e.g. TRS) may be FDM'd with a second synchronization signal (e.g. PSS and/or SSS). In another example, a beam reference signal (e.g. CSI-RS) may be FDM'd with another control/data channel (e.g., PDCCH and/or PDSCH carrying RMSI).

In yet another example, a beam reference signal (e.g. CSI-RS) may be FDM'd with a synchronization signal (e.g. PSS, SSS, TSS, TRS).

As described above, beam management procedures may utilize a number of different RS types. For example, a configuration may be signaled using a UE specific CSI-RS. Particularly, an RS defined for mobility purposes in at least a connected mode may be utilized. The RS may be a NR-SS, a CSI-RS, or a newly designed RS but is not limited thereto. The CSI-RS may be specifically configured for a UE. In some cases, multiple UEs may be configured with the same CSI-RS. The signal structure for CSI-RS may be specifically optimized for a particular procedure. Further, CSI-RS may also be used for CSI acquisition. Other RS could also be considered for beam management such as DMRS and synchronization signals.

The assisted access process described above may be referred to as a non-standalone (NSA) case. To support adaptation in such cases, a network (NW) indication of information may be provided to connected and/or idle mode UEs, such as an SS burst set periodicity and information to derive measurement timing/duration (e.g., time window for NR-SS detection).

In some cases, properties or a configuration of synchronization signal (SS) or CSI-RS used for mobility may be signaled to a UE using dedicated signaling. In some cases, the NW may provide a parameter that is valid for CSI-RS resources associated with detected cells on a carrier frequency (e.g. based on UE measurement reporting). In some cases, CSI-RS configuration may be provided via UE specific signaling (e.g., in a handover command). In some cases, a serving cell may provide information that assists a UE in deriving the reference time of a target cell in a synchronous system.

In some cases, for contention-free access, dedicated RACH resources may be provided in the time domain different from resources used for contention-based access. For example, a UE may be configured to transmit multiple Msg.1 over dedicated multiple RACH transmission occasions in the time domain before the end of a monitored RAR window. In such cases, the multiple Msg.1 can be transmitted with the same or different UE TX beams. The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first base station (BS), comprising:
communicating, in a first time interval, with at least a first user equipment (UE), via directional transmissions using a first set of frequency resources, wherein communicating with the first UE comprises receiving or monitoring for a first set of one or more signals in the first set of frequency resources from the first UE; and
participating in at least one of an access or management procedure, during the first time interval, via directional transmissions using a second set of frequency resources different from the first set of frequency resources, wherein participating in at least one of the access or management procedure further comprises receiving or monitoring for a second set of one or more signals in the second set of frequency resources.

2. The method of claim 1, wherein the at least one of an access or management procedure comprises at least one of: a directional initial access, beam management, mobility management, radio resource management (RRM), or radio link monitoring (RLM).

3. The method of claim 1, wherein:
communicating with the first UE further comprises transmitting a third set of one or more signals using the first set of frequency resources to the first UE; and participating in at least one of the access or management procedure further comprises transmitting a fourth set of one or more signals using the second set of frequency resources.

4. The method of claim 3, wherein participating in at least one of the access or management procedure comprises:
transmitting at least one of a directional synchronization (SYNC) signal, a beam reference signal, a physical broadcast channel (PBCH), a downlink control channel, or a downlink data channel carrying part of the system information.

5. The method of claim 4, wherein participating in at least one of the access or management procedure further comprises:
sweeping different transmit beam directions while transmitting the at least one of the directional SYNC signal, beam reference signal, PBCH, downlink control channel or downlink data channel.

6. The method of claim 3, wherein communicating with the first UE comprises:
transmitting at least one of a directional physical downlink shared channel (PDSCH), a physical downlink control channel (PDCCH), a paging channel, a beam reference signal, or a synchronization signal.

7. The method of claim 6, wherein a remaining minimum system information (RMSI) is transmitted using the physical downlink shared channel.

8. The method of claim 3, wherein the third set of one or more signals and the fourth set of one or more signals are quasi-collocated.

9. The method of claim 1, wherein the second set of one or more signals are related to a directional random access channel (RACH).

10. The method of claim 9, wherein participating in at least one of the access or management procedure further comprises:
sweeping different receive beam directions while monitoring the directional RACH transmission in the second set of frequency resources.

11. The method of claim 9, wherein communicating with the first UE comprises receiving at least one of a directional physical uplink shared channel (PUSCH) or physical uplink control channel (PUCCH) from the first UE.

12. The method of claim 9, wherein communicating with the first UE comprises communicating with the first UE as a part of a dedicated RACH procedure.

13. The method of claim 1, wherein the first set of frequency resources and the second set of frequency resources are non-overlapping.

14. The method of claim 1, wherein the first BS is configured to participate in the at least one of an access or management procedure with a second UE using the second set of resources.

15. The method of claim 14, wherein an indication of at least part of resources and configurations for participating in the at least one of an access and management procedure with the first BS is provided to the second UE by a second BS.

16. The method of claim 1, wherein communicating with the first UE involves at least one of backhaul (BH) communications, integrated access and backhaul (TAB) communications, or device to device (D2D) communications between the first UE and a second UE.

17. The method of claim 1, wherein the first BS operates in a millimeter-wave (mmWave) spectrum.

18. The method of claim 1, wherein the BS:
communicates with the first UE using a first antenna subarray; and
participates in at least one of the access or management procedure using a second antenna subarray.

19. An apparatus for wireless communication by a first base station (BS), comprising:
means for communicating, in a first time interval, with at least a first user equipment (UE), via directional transmissions using a first set of frequency resources, wherein the means for communicating with the first UE comprises means for receiving or monitoring for a first set of one or more signals in the first set of frequency resources from the first UE; and
means for participating in at least one of an access or management procedure, during the first time interval, via directional transmissions using a second set of frequency resources different from the first set of frequency resources, wherein the means for participating in at least one of the access or management procedure further comprises means for receiving or monitoring for a second set of one or more signals in the second set of frequency resources.

20. The apparatus of claim 19, wherein the at least one of an access or management procedure comprises at least one of: a directional initial access, beam management, mobility management, radio resource management (RRM), or radio link monitoring (RLM).

21. The apparatus of claim 19, wherein:
means for communicating with the first UE further comprises means for transmitting a third set of one or more signals using the first set of frequency resources to the first UE; and
means for participating in at least one of the access or management procedure further comprises means for transmitting a fourth set of one or more signals using the second set of frequency resources.

22. The apparatus of claim 21, wherein means for participating in at least one of the access or management procedure comprises:
means for transmitting at least one of a directional synchronization (SYNC) signal, a beam reference signal, a physical broadcast channel (PBCH), a downlink control channel, or a downlink data channel carrying part of the system information.

23. The apparatus of claim 22, wherein means for participating in at least one of the access or management procedure further comprises:
means for sweeping different transmit beam directions while transmitting the at least one of the directional SYNC signal, beam reference signal, PBCH, downlink control channel or downlink data channel.

24. The apparatus of claim 21, wherein means for communicating with the first UE comprises:
means for transmitting at least one of a directional physical downlink shared channel (PDSCH), a physical downlink control channel (PDCCH), a paging channel, a beam reference signal, or a synchronization signal.

25. The apparatus of claim 19, wherein:
the second set of one or more signals are related to a directional random access channel (RACH).

26. The apparatus of claim 25, wherein means for participating in at least one of the access or management procedure further comprises:
means for sweeping different receive beam directions while monitoring the directional RACH transmission in the second set of frequency resources.

27. The apparatus of claim 25, wherein means for communicating with the first UE comprises means for receiving at least one of a directional physical uplink shared channel (PUSCH) or physical uplink control channel (PUCCH) from the first UE.

28. The apparatus of claim 19, wherein:
the means for communicating uses a first antenna subarray; and
the means for participating uses a second antenna subarray.

29. An apparatus for wireless communication by a first base station (BS), comprising:
at least one processor configured to communicate, in a first time interval, with at least a first user equipment (UE), via directional transmissions using a first set of frequency resources, wherein communicating with the first UE comprises receiving or monitoring for a first set of one or more signals in the first set of frequency resources from the first UE, and to participate in at least one of an access or management procedure, during the first time interval, via directional transmissions using a second set of frequency resources different from the first set of frequency resources, wherein participating in at least one of the access or management procedure further comprises receiving or monitoring for a second set of one or more signals in the second set of frequency resources; and
a memory coupled with the at least one processor.

30. A non-transitory computer readable medium comprising computer-executable instructions that, when executed by a processor of a first base station (BS), cause the first BS to perform a method of wireless communications, comprising:
communicating, in a first time interval, with at least a first user equipment (UE), via directional transmissions using a first set of frequency resources, wherein communicating with the first UE comprises receiving or monitoring for a first set of one or more signals in the first set of frequency resources from the first UE; and
participating in at least one of an access or management procedure, during the first time interval, via directional transmissions using a second set of frequency resources different from the first set of frequency resources, wherein participating in at least one of the access or management procedure further comprises receiving or monitoring for a second set of one or more signals in the second set of frequency resources.

* * * * *